United States Patent
Avni

(10) Patent No.: US 12,177,673 B2
(45) Date of Patent: Dec. 24, 2024

(54) SYSTEM AND METHOD FOR DETERMINING A PHYSICAL LOCATION ASSOCIATED WITH AN ACTIVITY DETECTED ON A MOBILE DEVICE

(71) Applicant: The Toronto-Dominion Bank, Toronto (CA)

(72) Inventor: Michael Avni, Ganot (IL)

(73) Assignee: The Toronto-Dominion Bank, Toronto (CA)

( * ) Notice: Subject to any disclaimer, the term of this patent is extended or adjusted under 35 U.S.C. 154(b) by 316 days.

(21) Appl. No.: 17/459,064

(22) Filed: Aug. 27, 2021

(65) Prior Publication Data
US 2023/0064926 A1    Mar. 2, 2023

(51) Int. Cl.
*H04W 12/63*    (2021.01)
*H04L 9/40*    (2022.01)
(Continued)

(52) U.S. Cl.
CPC ........... *H04W 12/63* (2021.01); *H04L 63/107* (2013.01); *H04W 12/086* (2021.01);
(Continued)

(58) Field of Classification Search
CPC ... H04W 12/63; H04W 12/64; H04W 12/086; H04W 12/12; H04W 12/37; H04W 12/61;
(Continued)

(56) References Cited

U.S. PATENT DOCUMENTS

| 7,428,411 B2 | 9/2008 | Zellner |
| 7,885,639 B1 * | 2/2011 | Satish ................ H04W 12/122 455/410 |

(Continued)

OTHER PUBLICATIONS

Fedosova, Irina; Pronina, Olha; Piatykop, Olena; "Exploring Wi-Fi-based Indoor Positioning Techniques for Mobile App," IEEE International Conference on Information and Telecommunication Technologies and Radio Electronics (UkrMiCo), Odesa, Ukraine, 2021, pp. 109-114.*

(Continued)

*Primary Examiner* — Victor Lesniewski
(74) *Attorney, Agent, or Firm* — CPST Intellectual Property Inc.; Brett J. Slaney

(57) ABSTRACT

A system and method for determining physical locations associated with activities detected on mobile devices is disclosed. The method includes accessing at least one enterprise rule set which is based on a plurality of security vulnerability events, and for monitoring at least one application used on the mobile devices. Device data indicative of one or more actions performed on a mobile device and a time associated with each action is used to detect whether actions performed on the mobile device breach a rule of the enterprise rule set. Geolocation information associated with the mobile device at the time associated with the breach is received based on an identifier associated with the mobile device or with wireless network access points in range of the mobile device. The received geolocation information, enterprise rules, and device data is used determine if a security vulnerability is associated with the mobile device.

20 Claims, 8 Drawing Sheets

(51) Int. Cl.
*H04W 12/086* (2021.01)
*H04W 12/12* (2021.01)
*H04W 12/37* (2021.01)
*H04W 12/61* (2021.01)
*H04W 64/00* (2009.01)

(52) U.S. Cl.
CPC ........... *H04W 12/12* (2013.01); *H04W 12/37* (2021.01); *H04W 12/61* (2021.01); *H04W 64/003* (2013.01)

(58) Field of Classification Search
CPC ... H04W 64/003; H04W 4/029; H04W 4/021; H04W 12/08; H04L 63/107; H04L 63/1433; H04L 63/20
See application file for complete search history.

(56) References Cited

U.S. PATENT DOCUMENTS

| | | | |
|---|---|---|---|
| 8,233,882 B2 | 1/2012 | Rogel | |
| 8,886,925 B2 | 11/2014 | Qureshi et al. | |
| 8,932,368 B2 | 1/2015 | Fitzgerald et al. | |
| 9,038,158 B1* | 5/2015 | MacKay | H04L 63/0823 709/225 |
| 9,549,329 B2 | 1/2017 | Mancuso et al. | |
| 9,961,088 B2 | 5/2018 | Hughes, Jr. et al. | |
| 10,142,794 B1 | 11/2018 | Diamanti et al. | |
| 10,530,782 B2 | 1/2020 | Brockhuus et al. | |
| 10,735,411 B1* | 8/2020 | Hardt | H04L 67/52 |
| 10,984,120 B2 | 4/2021 | Nair | |
| 11,412,384 B1* | 8/2022 | Southern | H04W 4/025 |
| 2005/0037733 A1* | 2/2005 | Coleman | H04L 63/1416 455/411 |
| 2009/0214036 A1* | 8/2009 | Shen | G06Q 30/02 726/10 |
| 2009/0293106 A1* | 11/2009 | Gray | H04W 12/08 726/4 |
| 2011/0287787 A1* | 11/2011 | Nagaraja | H04W 4/02 455/456.3 |
| 2014/0007222 A1* | 1/2014 | Qureshi | H04L 67/10 726/16 |
| 2014/0161027 A1* | 6/2014 | Larue | H04W 12/122 370/328 |
| 2016/0080378 A1* | 3/2016 | VanBlon | H04W 4/02 455/410 |
| 2016/0261606 A1 | 9/2016 | Salvador | |
| 2017/0237747 A1* | 8/2017 | Quinn | G06F 21/602 726/29 |
| 2017/0289806 A1* | 10/2017 | Girdhar | H04W 12/64 |
| 2018/0152845 A1* | 5/2018 | Unnerstall | G06Q 20/3224 |
| 2018/0359244 A1* | 12/2018 | Cockerill | H04L 63/0823 |
| 2019/0304217 A1* | 10/2019 | Hamidifar | H04W 4/80 |
| 2020/0092332 A1* | 3/2020 | Bhattathiri | G06F 21/53 |
| 2020/0351655 A1* | 11/2020 | Sunkavally | H04L 63/205 |
| 2020/0382952 A1* | 12/2020 | Alonso Cebrian | H04W 12/64 |
| 2021/0344664 A1* | 11/2021 | Alameh | H04W 12/08 |
| 2022/0029976 A1* | 1/2022 | Ericksen | H04W 12/63 |

OTHER PUBLICATIONS

Blázquez et al.; "Trouble Over-The-Air: An Analysis of FOTA Apps in the Android Ecosystem," IEEE Symposium on Security and Privacy (SP), San Francisco, CA, USA, 2021, pp. 1606-1622.*

Delac et al., "Emerging security threats for mobile platforms," 2011 Proceedings of the 34th International Convention MIPRO, pp. 1468-1473, May 23, 2011; https://citeseerx.ist.psu.edu/viewdoc/download?doi=10.1.1.929.4305&rep=rep1&type=pdf.

Zhang et al., "Location-Based Authentication and Authorization Using Smart Phones," 2012 IEEE 11th International Conference on Trust, Security and Privacy in Computing and Communications, pp. 1285-1292, Jun. 25, 2012; https://www.diva-portal.org/smash/get/diva2:576463/FULLTEXT01.pdf.

* cited by examiner

SYSTEM AND METHOD FOR DETERMINING A PHYSICAL LOCATION ASSOCIATED WITH AN ACTIVITY DETECTED ON A MOBILE DEVICE

TECHNICAL FIELD

The following relates generally to enterprise resource security, and more particularly to enterprise resource security on mobile devices, for example to determine a physical location associated with an activity detected on such mobile devices.

BACKGROUND

Increasing mobile device usage by employees within an enterprise has introduced new potential avenues for security breaches to occur. Mobile device vulnerability is increasingly important in the banking or financial industry with the proliferation of mobile device based financial and payment management. Moreover, with recent trends of employees working remotely and from home, the amount of enterprise resources which an enterprise is expected to make available to mobile devices can be expansive.

Mobile devices can be vulnerable to hacking, theft, or other security vulnerabilities where the mobile device's access to internal enterprise resources may be accessed or utilized by an unauthorized user, either maliciously or inadvertently. For example, the unauthorized user could misuse confidential enterprise information on a personal level or be part of, or conspire with, criminal enterprises or other adversaries, to steal data in a targeted fashion.

Hacking, theft or other operations that lead to vulnerabilities may also employ a series of maneuvers to avoid detection. For example, the hacking operations may exploit the mobile device to corrupt its ability to accurately determine its location.

Improvements or additional safeguards added to enterprise resource security for mobile devices would be desirable.

BRIEF DESCRIPTION OF THE DRAWINGS

Embodiments will now be described with reference to the appended drawings wherein.

DETAILED DESCRIPTION

Figure 1:
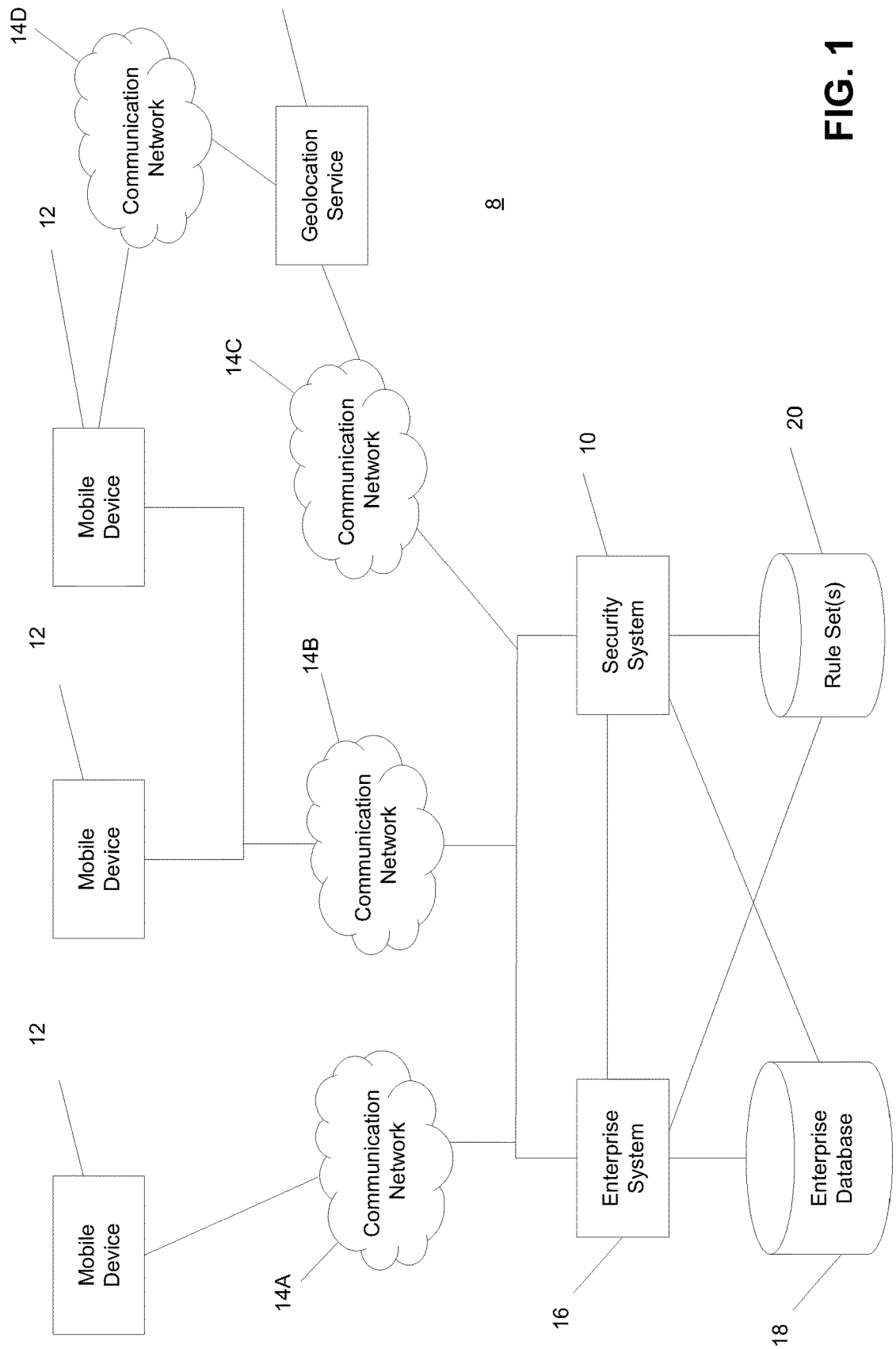
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

In one aspect, a system for determining physical locations associated with activities detected on mobile devices is disclosed. The system includes a processor, a communications module coupled to the processor, and a memory coupled to the processor. The memory stores computer executable instructions that when executed by the processor cause the processor to access at least one enterprise rule set, the at least one enterprise rule set based on a plurality of security vulnerability events, the at least one enterprise rule set for monitoring at least one application used on the mobile devices. The memory also stores computer executable instructions that when executed by the processor cause the processor to receive device data indicative of one or more actions performed on a mobile device and a time associated with each action and compare the device data with the at least one enterprise rule set to detect whether any of the one or more actions performed on the mobile device breaches a rule of the at least one enterprise rule set. The memory also stores computer executable instructions that when executed by the processor cause the processor to transmit, to a geolocation service, a request for geolocation information associated with the mobile device at the time associated with the breach of the corresponding rule, the request including at least one of an identifier associated with the mobile device, an identifier associated with one or more wireless network access points which the mobile device is in range of, or both; and receive, from the geolocation service, geolocation information associated with the transmitted identifier, wherein the geolocation service is an external database for collecting information about wireless network access points. The memory also stores computer executable instructions that when executed by the processor cause the processor to use the received geolocation information and device data to enterprise rule set to determine if a security vulnerability is associated with the mobile device.

In a further aspect, a method for determining physical locations associated with activities detected on mobile devices is disclosed. The method includes accessing at least one enterprise rule set, the at least one enterprise rule set based on a plurality of security vulnerability events, the at least one enterprise rule set for monitoring at least one application used on the mobile devices. The method also includes receiving device data indicative of one or more actions performed on a mobile device and a time associated with each action; and comparing the device data with the at least one enterprise rule set to detect whether any of the one or more actions performed on the mobile device breaches a rule of the at least one enterprise rule set. The method also includes transmitting, to a geolocation service, a request for geolocation information associated with the mobile device at the time associated with the breach of the corresponding rule, the request including at least one of an identifier associated with the mobile device, an identifier associated with one or more wireless network access points which the mobile device is in range of, or both; and receiving, from the geolocation service, geolocation information associated with the transmitted identifier, wherein the geolocation service is an external database for collecting information about wireless network access points. The method also includes using the received geolocation information and device data to enterprise rule set to determine if a security vulnerability is associated with the mobile device.

In another aspect, a non-transitory computer readable medium (CRM) for determining physical locations associated with activities detected on mobile devices is disclosed. The computer readable medium includes computer executable instructions for accessing at least one enterprise rule set, the at least one enterprise rule set based on a plurality of security vulnerability events, the at least one enterprise rule set for monitoring at least one application used on the mobile devices. The computer readable medium also includes computer executable instructions for receiving device data indicative of one or more actions performed on a mobile device and a time associated with each action and comparing the device data with the at least one enterprise rule set to detect whether any of the one or more actions performed on the mobile device breaches a rule of the at least one enterprise rule set. The computer readable medium also includes computer executable instructions for transmitting, to a geolocation service, a request for geolocation information associated with the mobile device at the time associated with the breach of the corresponding rule, the request including at least one of an identifier associated with the mobile device, an identifier associated with one or more wireless network access points which the mobile device is in range of, or both; and receiving, from the geolocation service, geolocation information associated with the transmitted identifier, wherein the geolocation service is an external database for collecting information about wireless network access points. The computer readable medium also includes computer executable instructions for using the received geolocation information and device data to enterprise rule set to determine if a security vulnerability is associated with the mobile device.

In certain example embodiments, the system, method or CRM can include a first set of instructions executed on the mobile device and a second set of instructions executed on a server device. The first set of instructions can include instructions to receive the device data, access the at least one enterprise rule set, and provide a result of the comparison to the server device. The first set of instructions can further include instructions to transmit a request for the geolocation information and to provide the received geolocation information to the server device to determine the security vulnerability.

In certain example embodiments, the system, method or CRM can be implemented using a server device in communicably coupled to the mobile devices.

In certain example embodiments, the one or more actions performed on the mobile device can include at least one screenshot.

In certain example embodiments, the one or more actions performed on the mobile device can include executing a file sharing activity.

In certain example embodiments, the one or more actions performed on the mobile device can include accessing a particular network.

In certain example embodiments, the system, method or CRM can be further configured to, in response to determining the received geolocation information is correlated to the particular network that lacks a required degree of security, preventing actions at least one action on the mobile device. The required degree of security can prevent use of network access points that are unauthorized.

In certain example embodiments, the system, method or CRM can be configured to, in response to determining the received geolocation information is associated with a flagged location, or activity associated with or near the flagged location, prevent at least one action on the mobile device.

Security breaches, criminal or otherwise, can often affect or be implemented using mobile devices. Mobile devices can therefore facilitate enterprise resource access (e.g., confidential information, computing resources, etc.) in a variety of malicious circumstances and/or for malicious uses (i.e., misuses). In addition to mobile devices facilitating enterprise resource access, they also make it easier for employees to both intentionally or inadvertently leak information to the public or adversaries.

To prevent enterprise resource breaches via mobile devices, the proposed implementations may include logic to detect events on mobile devices and to compare the events against an enterprise rule set. The enterprise rule set is indicative of various actions or inputs to a mobile device that can be or are correlated to security breaches, criminal activities, or other vulnerabilities. The logic can detect these events and a time at which the events occurr(ed) and initiate an API query to an external geolocation service (such as WiGLE) to correlate or corroborate the physical location of the activity. For example, where the vulnerability has impeded the mobile device's ability to accurately determine a location based on GPS coordinates, the logic can use the location of nearby wireless networks received from the external geolocation service to determine a more accurate or likely location of the mobile device. In another example, the logic stores information about the surrounding networks and their locations received from the geolocation service. This allows further correlations to be made, such as against known locations of organized crime. In other scenarios, where data leakage has occurred, the geolocation of where that activity occurred can be used to target other devices with access to enterprise resources in that area to avoid further misuse or implement additional monitoring.

FIG. 1 illustrates an exemplary computing environment 8 which integrates or connects a security system 10, an enterprise system 16 (e.g., a financial institution system), one or more mobile devices 12 (hereinafter referred to in the singular for ease of reference), and a geolocation service 22 via communications network(s) 14.

Geolocation service 22 can provide geolocation information about mobile devices 12 in response to receiving an identifier associated with the mobile device 12. The geolocation service 22 can store or access an external database associated with the service to provide the location information. For example, geolocation service 22 can provide an estimated location of the mobile device 12 in response to receiving information (e.g., an SSID, a MAC address, a signal strength, etc.) about wireless communication network(s) 14 within range of the mobile device 12, and determining a location associated with the identifiers. In another example, geolocation service 22 may provide information about wireless networks within range of the mobile device 12 in response to receiving GPS coordinates from the mobile device 12. In further illustrative examples, the geolocation service 22 can receive both GPS coordinates and the identifier information (e.g., a signal strength) about wireless communication network(s) 14 (alternatively referred to as wireless network access points) within range of the mobile device 12 and return some form of corroboration of the GPS coordinates (e.g., a likelihood the location information is correct).

The enterprise system 16 provides access to enterprise resources to users of mobile devices 12. For example, a financial institution system 16 can be configured to allow employees to access various enterprise resources such as computing resources in the form of virtual computing environments, etc. The enterprise system 16 can include or otherwise have access to a database 18 for storing enterprise data. The database 18 can include data associated with: a user of a mobile device 12 (e.g., employee information), the enterprise (e.g., product and service confidential information, etc.), enterprise clients (e.g., client banking information, etc.), and any information related thereto. For example, the database 18 can also include, without limitation, demographic data (e.g., age, gender, income, location, etc.), preference data input by the client, and inferred data generated through machine learning, modeling, pattern matching, or other automated techniques, historical information related to interactions and transactions associated with the enterprise system 16 (e.g., login history, search history, communication logs, documents, etc.). The access to enterprise system 16 is intended to be contingent upon the employees utilizing the aforementioned access to complete their employment obligations or other authorized activities.

Security system 10 can act as a gateway for requests to enterprise resources hosted by or otherwise controlled by enterprise system 16 or can act to monitor usage by the mobile devices 12 of accessed enterprise resources. Security system 10 monitors access to or rejects access to enterprise resources based on enterprise rule set(s) 20 stored in database (the database being referred to herein as the rule set(s) 20 for ease of illustration). The database storing the rule sets 20, and the enterprise rule sets 20 thereon, can be dynamically or periodically updated based on instructions received from enterprise system 16. The enterprise rule sets 20 may also be updated based on information external to enterprise system 16. For example, the enterprise rule sets 20 may be configured to be updated based on information received from a geolocation service 22, behavior of other mobile devices 12 within the computing environment 8, general security practices, and so forth.

In example embodiments, the security system 10 may be one or more computer systems configured to process and store information and execute software instructions to perform one or more processes consistent with the disclosed embodiments. In certain embodiments, although not required, the security system 10 may be associated with or one or more enterprise systems or be provided as a separate service to such enterprises. The security system 10 can be part of a third-party service outside of the enterprise system 16. Portions of the enterprise system 16 may also be hosted on a third-party system, for example on a cloud-based system.

It can be appreciated that while the security system 10 and enterprise system 16 are shown as separate entities in FIG. 1, they may also be part of the same system. For example, the enterprise system 16 and security system 10 may be part of a data management system associated with a commercial bank (e.g., financial institution system), a retailer, a government organization, an inter-entity organization such as a joint venture, or some other type of business or enterprise. The security tracking system 10 can be hosted and provided within the enterprise system 16, i.e., in a "private" cloud.

The enterprise rule sets 20 can be based on the correlation of a plurality of security vulnerable events to one or more actions on a mobile device, or the enterprise rule sets 20 can be based on metadata associated with the one or more actions. For example, requests to access enterprise resources after 10 PM local time may be rejected or only provided in settings including enhances security for enterprise resource access after 10 PM local time. The enterprise rule sets 20 can be based on one or more actions which utilize native functionality (e.g., a functionality typically provided for or by the device manufacturer and intended to provide basic functionality of the device) of the mobile device 12. For example, an enterprise rule set 20 may specify that a security vulnerable event has occurred (which may lead to the enterprise resources being more closely monitored) where successive screenshot capture actions are detected. Continuing the example, the enterprise rule set 20 may specify that successive screenshots by the mobile device 12 when accessing particular documents (e.g., documents marked sensitive) is a security vulnerable event. The enterprise rule sets 20 can be based on one or more actions which copy, manipulate, or otherwise to move enterprise information outside of an enterprise established sandbox. For example, the enterprise rule set 20 may specify the one or more actions to initiate file sharing (e.g., via Nearby Share on an Android™ device), is a security vulnerable event. In another example, the enterprise rule set 20 may specify that one or more actions to remove security features associated with enterprise resources (e.g., remove any document right management (DRM) settings on enterprise documents) is a security vulnerable event. The enterprise rule sets 20 can also be based at least in part on the location of the mobile device 12.

Mobile devices 12 may be associated with one or more users. Users may be referred to herein as customers, clients, correspondents, employees or other entities that interact with the enterprise system 16 and/or database 18 (directly or indirectly). The computing environment 8 may include multiple mobile devices 12, each mobile device 12 being associated with a separate user or associated with one or more users. In certain embodiments, a user may operate mobile device 12 such that mobile device 12 accesses one or more enterprise resources. For example, the user may use mobile device 12 to engage and interface with a mobile or web-based banking application which uses or accesses enterprise resources, the security system 10 or both. The user can store and manage documents used in an application, process workflow or other operation which uses enterprise resources. In certain aspects, mobile device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, a mobile payment processor, and any additional or alternate mobile computing device, and may be operable to transmit and receive data across any of communication network(s) 14.

Communication network(s) 14 can include a plurality of different networks, such as the shown communication networks 14A to 14D, to which mobile device 12 can connect to. In some instances, the communication network (e.g., communication network 14D) does not connect the mobile device 12 to the enterprise system 16, but connects the mobile device 12 to another system, such as the geolocation service 22, or to any other communication network which is associated with a network in location database such as the WiGLE database. Hereinafter, unless explicitly stated otherwise, the term communication network 14 shall be used to refer to a communication network 14 which enables the mobile device 12 to connect to at least one of the enterprise system 16 or the security system 10. Communication network 14 may include a telephone network, cellular, and/or data communication network to connect different types of mobile devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

Continuing with FIG. 1, enterprise system 16, security system 10, and/or computing environment 8 more widely, may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the enterprise system 16 and security system 10. The cryptographic server may be used to protect the database 18, database containing the rules sets 20, and/or data stored in the enterprise system 16 or the security tracking system 10, by way of encryption for data protection, digital signatures or message digests for data integrity, and by using digital certificates to authenticate the identity of the users and mobile devices 12 with which the enterprise system 16 and/or security system 10 communicates to inhibit data breaches by adversaries. It can be appreciated that various cryptographic mechanisms and protocols can be chosen and implemented to suit the constraints and requirements of the particular deployment of the enterprise system 16 or security system 10 as is known in the art.

Figure 2:
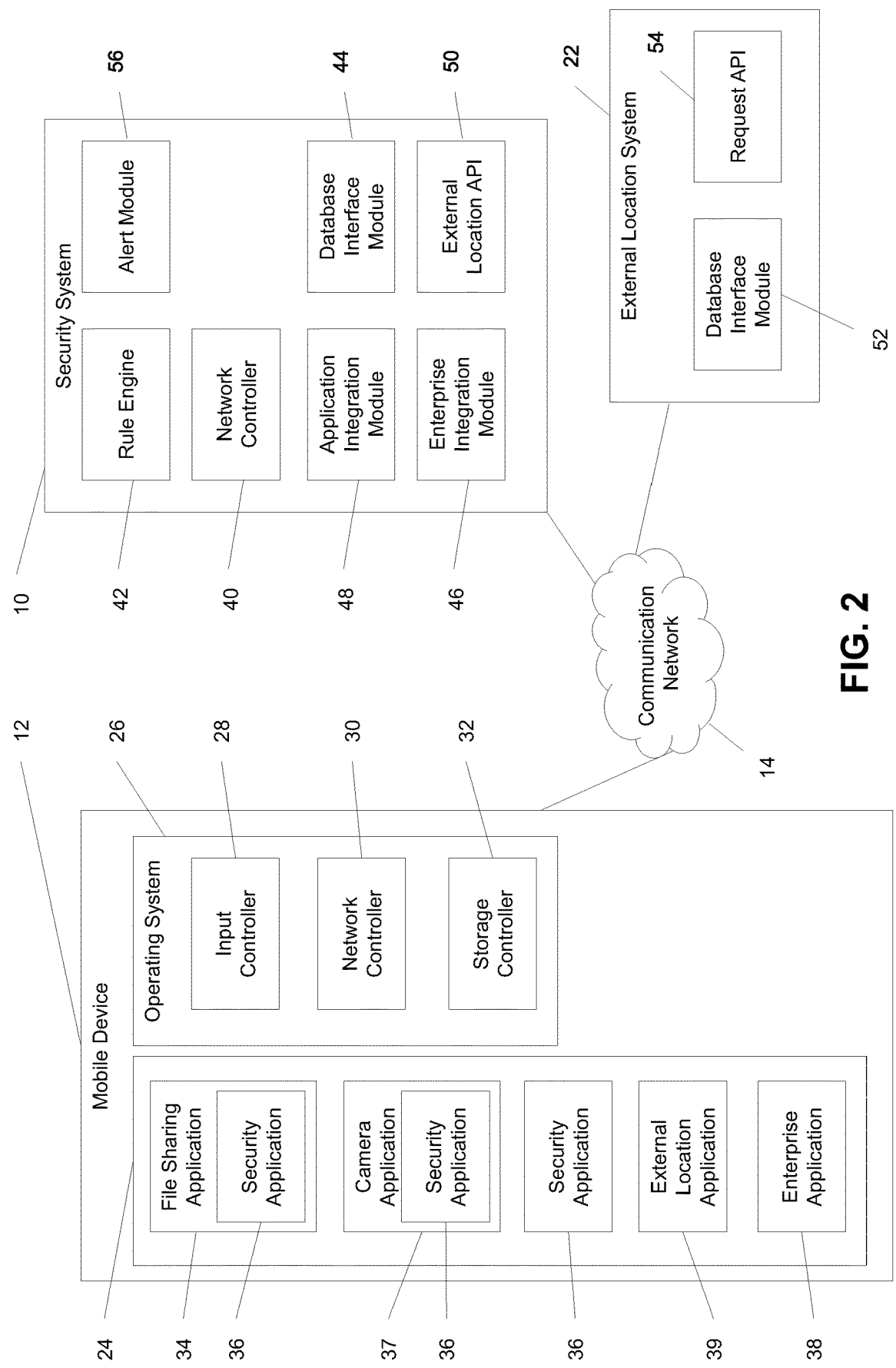
FIG. 2 is a diagram of an example mobile device, security system and external location device.

FIG. 2 illustrates a schematic diagram of an example security system 10, mobile device 12, and the geolocation service 22.

Mobile device 12 includes an operating system 26 which includes one or more controllers: input controller 28 for listening for user input associated with the mobile device 12 (e.g., interaction with a keyboard or touchscreen), and communicating the aforementioned user input to the relevant application; network controller 30 for managing application requests to utilize a network card or other device hardware (e.g., communication module 812 of FIG. 8) to access communications network 14; and a storage controller 32 for managing application requests to access or modify mobile device 12 storage (e.g., storage 806 in FIG. 8) such as a solid-state hard drives of the mobile device 12.

Mobile device 12 also includes one or more applications (shown in FIG. 2 as the plurality of applications 24 and referred to herein after as "applications"), provided or maintained by third parties, manufacturers of the mobile device 12, retailers and so forth. The applications 24 can, depending on the permissions granted by the mobile device 12 administrator or user or otherwise, access various components of the operating system 26 and enterprise resources. For example, a file sharing application 34 may access the network controller 30 of the operating system 26 to send files over Bluetooth™. Some applications may not have access to enterprise resources directly, but indirectly. For example, camera application 37 may include or access the storage controller 32 to store screenshots of whatever is on a screen of the mobile device 12, such as enterprise documents. The mobile device 12 can also include external location application 39 that communicates with geolocation service 22. Some of the applications may be active simultaneously, and various combinations of applications may be active at any given time and requesting access to enterprise resources.

In one aspect, in order to access enterprise resources, the enterprise system 16 can require the respective applications 24 of the mobile device 12 to authenticate their credentials via the security system 10. In this respect, the respective application may request access to network controller 30 of mobile device 12, by sending a request for authentication to the security system 10. In example embodiments a separate security application 36, or enterprise application 38, needs to be active in order for the request to be processed, and the security application 36 manages all requests to access enterprise resources by the mobile device 12. In some aspects, the security application 36, or enterprise application 38 are integrated into other applications 24, as shown in respect of the camera application 37, and manage requests though the respective application.

Security system 10 can receive the aforementioned request through the network controller 30, and thereafter the rule engine 42 can determine whether to grant the requested access. In embodiments where requests are received directly from an application 24 not managed by security system 10 or the enterprise system 16 (e.g., from file sharing application 34), requests may be received and managed via application integration module 48.

In example embodiments, requests to access enterprise resources may be granted, and the rule engine 42 may monitor the access to determine whether to prevent the action subsequently. For example, where a user is authenticated, the request to access the enterprise resource may be granted, and the rule engine 42 may monitor further interaction with the enterprise resource to determine whether further actions should be prevented.

Rule engine 42 can connect to the database storing the enterprise rule sets, whether stored on database 20 or database 18, to determine whether to grant access. For example, a separate module can be implemented when accessing the different databases where they are operated by different entities, such as database interface module 44 and enterprise integration module 46 for accessing, respectively, database 20 and database 18.

Determining whether to grant access to the enterprise resources based on the retrieved enterprise rule sets and location information requires rule engine 42 to connect to geolocation service 22, for example via an external location API 50, to receive geolocation information from the geolocation service 22. Geolocation information can include an approximated (e.g., via triangulation) location of one or more wireless networks (e.g., as provided by the WiGLE database) near a particular set of GPS coordinates or other geographic frame of reference, information related to the aforementioned one or more wireless networks, including wireless security settings, signal strength, SSID's, MAC addresses, and so forth. Geolocation information can also include an approximated location of a mobile device in response to receiving information about one or more nearby wireless networks. Security system 10 can further include an alert module 56 to generate alerts or manage alerts resulting from breaches of rules of the enterprise rule set. For example, the alert module 56 may store alerts, and related metadata or context data, for later auditing or analyses.

Geolocation service 22 can receive a request for geolocation information from mobile device 12 directly (e.g., via security application 36) and manage same via the request API 54. Geolocation service 22, similar to security system 10, may include one or more database interface modules 52 for accessing and otherwise interacting with an associated database.

Figure 3:
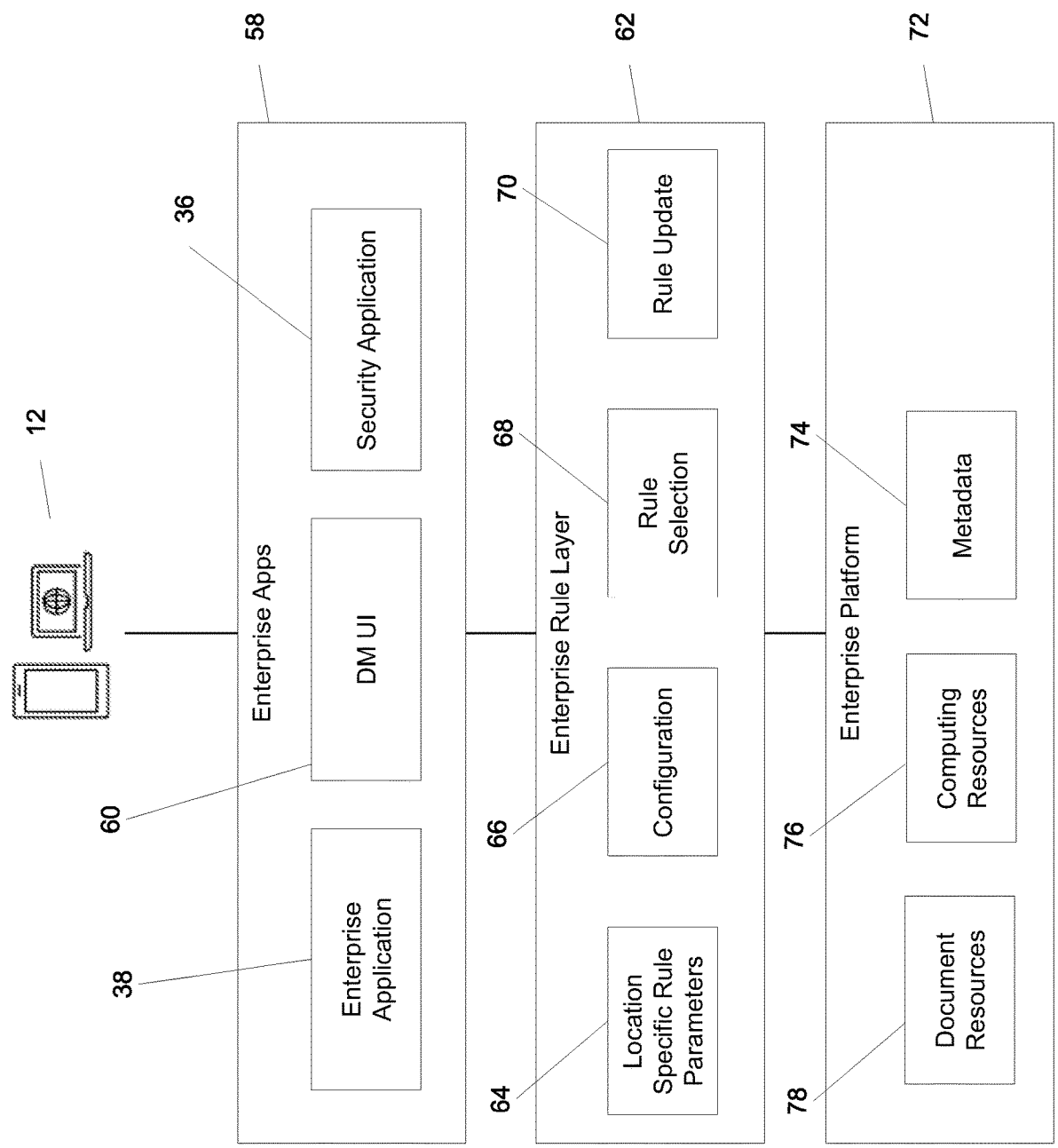
FIG. 3 is a schematic diagram of conceptual view of a mobile device resource access management system that can be implemented in the computing environment of FIG. 1.

Referring now to FIG. 3, a schematic diagram of conceptual view of a system for determining a physical location associated with an activity detected on a mobile device is shown. The schematic diagram describes an example implementation of managing, for example, enterprise resource access requests for an employee of a financial institution.

Applications which are installed on mobile device 12 and managed by an enterprise, or control access to enterprise resources are shown in an enterprise layer 58. The enterprise layer 58 can include the enterprise application 38, which may allow general access to enterprise resources, and can for example include an application which provides access to a virtual instance of an employee desktop. The enterprise layer 58 applications may be more specialized. For example, a document management (DM) user interface 60 may be used by a mobile device to specifically view enterprise documents saved in an enterprise document system. The enterprise layer 58 can include the aforementioned security application 36 which may implement the described rule engine 42 on the mobile device 12, on the security system 10, on the enterprise system 16, or on any combination thereof.

The enterprise rule layer 62 includes one or more routines outlining the enterprise rule sets of the rule engine 42 and the manner in which the enterprise rule sets are applied by, for example, the security application 36. The enterprise rule layer 62 can include a configuration routine 66 for specifying the manner in which the enterprise rule sets are applied. For example, configuration routine 66 may include instructions as to whether mobile device 12 is required to have the security application 36 integrated into the plurality of applications 24, or whether employee enterprise resource access requires a separate instance of the security application 36 running during access. In another illustrative example, configuration routine 66 specifies permissions allowed to be granted to other applications 24. For example, configuration routine 66 may specify that no applications 24 may be granted access to overwrite a local folder associated with enterprise application 38. Configuration routine 66 can also control a variety of parameters associated granting access to enterprise resources, including, for example, establishing a metadata logging frequency, establishing a frequency of scanning for compliance with the enterprise rule set, and so forth.

Location specific rule routine 64 of enterprise rule layer 62 includes a variety of rule routines required to collect or disseminate geolocation information. For example, location specific rule parameters routine 64 may periodically engage network controller 30 to retrieve GPS coordinates of the mobile device 12 or engage network controller 30 to retrieve information from and log information about nearby communication networks 14, including communication networks 14D not connected to the enterprise system 16. The routine 64 can also retrieve any information stored within the enterprise system 16, the security system 10, or third party system (not shown) and associated with the GPS coordinates or the nearby communication networks 14. In an illustrative example, routine 64, via database interface module 44, accesses a crime statistics database maintained by a local police force and retrieves information associated with the GPS coordinates of the nearby communication network 14.

Rule update routine 70 controls various aspects of updating the enterprise rule set. For example, the rule update routine 70 may specify the procedure by which the enterprise rule set is updated, including, but not limited to: specifying which entities are allowed to send rule updates, specifying the level of encryption required for receiving or retrieving rule updates, specifying the allowable channels through which updates are allowed to be received, specifying any further credentials required to accept updates, storing any rules for propagating updates between mobile devices 12 that are enterprise managed, and so forth. The rule update routine 70 may be unidirectional, in that it may only update a local copy of the enterprise rule set stored on the mobile device 12. Alternatively, the rule update routine 70 may be bidirectional, updating both a local copy of the enterprise rule set, and initiating requests to update a master copy of the enterprise rule set managed by enterprise system 16.

Rule selection routine 68 determines which rules or enterprise rule sets of the various enterprise rule set stored on database 18 are applied to the particular mobile device 12. Rule selection routine 68 may work in conjunction with the location routine 64 and determine whether a subset of rules applicable to the specific location determined by the location routine 64 should be monitored for. Rule selection routine 68 can also interface with either configuration routine 66 or rule update routine 70 to determine an applicable set of rules. For example, different enterprise rule sets may be used where the either the configuration routine 66 or the rule update routine 70 indicate a particular enterprise rule set for the hardware or software running on the particular mobile device 12 (e.g., a mobile phone running macOS™ or Android™, etc.). Rule selection routine 68 can also interface with the enterprise system 16 (e.g., via an enterprise integration module 46 where rule selection routine 68 is performed on security system 10) to determine rules associated with the user authorized or expected to be using the particular mobile device 12.

Enterprise platform layer 72 is representative of the enterprise resources that were being accessed by the mobile devices 12. The enterprise layer 72 can include document resources 78 which can include all documents available in the enterprise system 16, and which may be integrated with the DM user interface 60. The computing resources 76 in the enterprise platform layer 72 can represent access to virtual testing environments, and computational resources other than the document resources layer 78. Metadata 74 can include a track of all interactions between the mobile device 12 and the enterprise platform layer 72, including a time of access, location associated with the mobile device 12 when access was requested and granted, the credentials entered in order to request access, the types of documents and/or resources access by the mobile device 12, any edits made to the access resources, and so forth.

Figure 4:
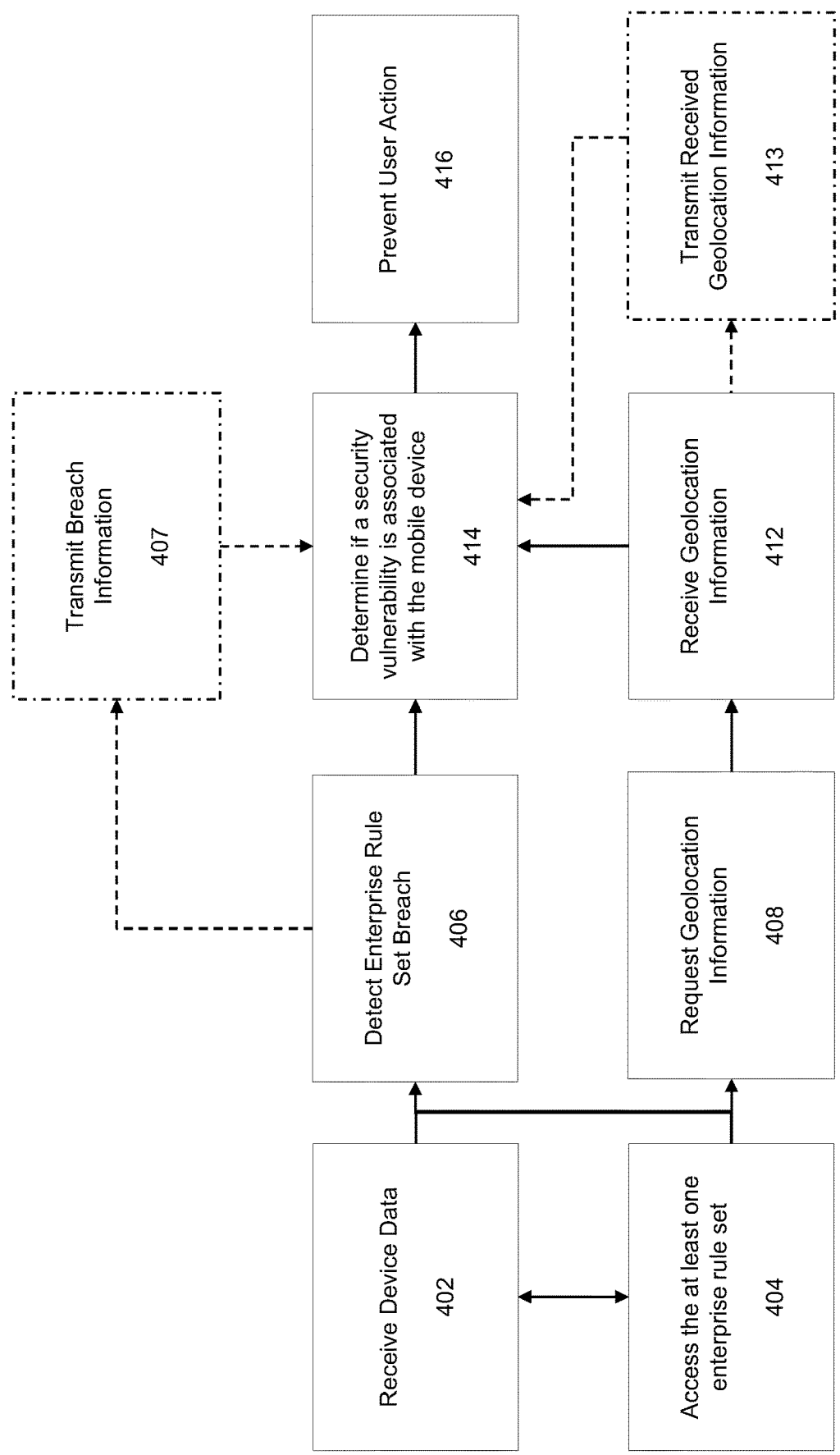
FIG. 4 is a flow diagram for determining physical locations associated with activities detected on mobile devices.

FIG. 4 shows a flow diagram for determining physical locations associated with activities detected on mobile device 12. The diagram can be reflective of computer executable instructions stored on memory coupled to a processor which causes the processor to carry out the flow described in FIG. 4.

At block 402, device data indicative of one or more actions performed on the mobile device 12 and a time associated with each action is received. In example embodiments, receiving the device data involves the device data moving between applications on the mobile device 12. For example, the receiving may occur as the device data is sent to the security application 38 or enterprise application 36. In example embodiments, receiving the device data denotes the data being transmitted from the mobile device 12 to the security system 10 or the enterprise system 16. The device data is not limited to the one or more actions performed on the mobile device 12 and a time associated with each action. The device data may particularize further data associated with the one or more actions. For example, the device data can include data particularizing which of the plurality of applications 24 on mobile device 12 was operating during the one or more user actions, or which of the applications generated a request to access enterprise resources in response to the one or more actions. The device data can include data associated with actions (e.g., clicking, confirming, dictating) including attempts to install new software on the mobile device 12, actions which have the effect of requesting access to enterprise documents (e.g., double clicking the document in the file sharing application 34), actions to manipulate or modify existing enterprise resources stored locally on the mobile device 12, (e.g., attempts to change metadata or temporary versions of existing enterprise resource stored locally on the mobile device 12), and so forth. In example embodiments, the device data can include data associated with an action generated or started within an application 24 not managed or related to the enterprise associated with the enterprise rules, such as the file sharing application 34 requesting access to enterprise documents stored locally on the mobile device 12 via the storage controller 32.

At block 404, at least one enterprise rule set based on a plurality of security vulnerable events is accessed. The at least one enterprise rule set can be stored on storage local to the mobile device 12. For example, rule engine 42 can be a separate subcomponent of enterprise application 38 or security application 36, which applications may further store the enterprise rule set to implement the functionality of rule engine 42. In example embodiments, the at least one enterprise rule set is stored other than on mobile device 12: The at least one enterprise rule set can be stored on database 20, and accessible only via security system 10 or enterprise system 16. Accessing the at least one enterprise rule set can include security system 10 or enterprise system 16 retrieving the at least one enterprise rule set from storage and providing same to the mobile device 12, via the rule engine 42 or otherwise.

The at least one enterprise rule set can be accessed in response to the mobile device 12 detecting the one or more actions (e.g., user clicking), or it can be accessed when at least one application of the plurality of applications 24 is accessed and running on the mobile device 12, or it can be accessed upon startup of the mobile device 12 or otherwise. In embodiments where the rule set is accessed in response to the one or more actions or when at least one application 24 is running on the mobile device 12, a subset of enterprise rules or a subset of enterprise rules associated with the respective actions or application may be accessed. For example, where the one or more actions are associated with a file sharing application, the mobile device 12 may only access the enterprise rule set associated with file sharing applications.

At block 406, the rule engine 42 compares the device data with the at least one enterprise rule set to detect whether any of the one or more actions performed on the mobile device 12 breaches a rule of the at least one enterprise rule set.

The rule engine 42 can determine which enterprise resources are responsive to the action to further particularize which enterprise rules are relevant. For example, the engine 42 may use different rule sets depending on whether enterprise documents, or enterprise computing power is being accessed.

In example embodiments, the comparing may be performed by the rule engine 42 accessing local storage and monitoring device operation, including one of the network controller 30, the input controller 28, or the storage controller 32. In some scenarios the at least one enterprise rule set may include a rule precluding executing a file sharing activity which involves enterprise documents (e.g., monitoring network controller 30). In this respect, rule engine 42 may determine that any attempts to share a file which is an enterprise resource, from any application 24, breaches the enterprise rule. In another illustrative example, an enterprise rule can specify that attempts to change metadata or temporary versions of existing enterprise resource stored locally on the mobile device 12 (e.g., monitoring storage controller 32) breaches enterprise rules. In further illustrative example, the at least one enterprise rule set may include a rule precluding taking screenshots (e.g., monitoring input controller 28) while enterprise resources are accessed, and any action to take screenshots will result in a determination that there is a breach of the at least one enterprise rule set. In yet another illustrative example, the at least one enterprise rule set may include a rule that accessing one or more particular networks (e.g., a known compromised network) is a breach of the respective rule set.

In example embodiments, the rule engine 42 can determine a severity or degree of breach associated with the one or more actions. For example, the rule engine 42 can determine that the mobile device 12 has breached the rule precluding a particular number of successive screenshots, but determine a low severity associated with the breach where the screenshots were taken within fractions of a second of one another. The rule engine 42 can also simultaneously evaluate actions on the basis of two different enterprise rule sets, or to different rules within a single enterprise rule set. For example, rule engine 42 may enforce a global policy (e.g., only certain level of employee can access certain documents) and a local policy (e.g., only specific subset of the required level of employee can access certain local documents). In another example, rule engine 42 may enforce a rule of an enterprise rule set which allows third-party file sharing applications to be installed on a mobile device 12, while also simultaneously enforcing a rule the file sharing applications cannot be provided with access to data generated by a camera application 37 of the mobile device 12.

At block 408, a request for geolocation information associated with the mobile device 12 at the time associated with the breach of a corresponding rule (i.e., step 406) is transmitted to the geolocation service 22. The request includes at least one of an identifier associated with the mobile device 12, an identifier associated with one or more wireless network access points which the mobile device is in range of, or both.

The identifier associated with the mobile device can include GPS coordinates determined by the mobile device 12. The identifier associated with one or more wireless networks access points which the mobile device 12 is in range of can include names of communications networks 14 near the mobile device 12, and other information associated with nearby communications networks 14 such as SSIDs, MAC addresses, and so forth. In an illustrative example, each of the mobile devices 12 shown in FIG. 1 may be in range with a different combination of communication networks 14A, 14B, 14C, and 14D, and provide the identifiers associated with set communication networks the respective mobile device 12 is in communication with to the geolocation service 22.

As shown in FIG. 4, blocks 402, 404, 406, and 408 can occur at separate times or simultaneously, and the aforementioned steps may be completed in various sequences. For example, the geolocation information associated with the mobile device 12 may be requested prior to accessing the enterprise rule set(s), or geolocation information associated with the mobile device 12 can be requested only after it is determined that the enterprise rule set(s) is breached.

At block 412, the requested geolocation information is received from the geolocation service 22. For example, the geolocation information may be received by mobile device 12 after being routed through security system 10.

At block 414, the received geolocation information (i.e., the information received in block 412) and device data (i.e., the device data of block 402) is used to determine if a security vulnerability is associated with the mobile device 12.

A security vulnerability may be associated with the mobile device 12 where the breach is detected in a geolocation associated with the security vulnerability. For example, a breach of the at least one enterprise rule set in an area associated with criminal activity can be determined to be a security vulnerability. In another illustrative example, a breach of the at least one enterprise rule set in a geolocation typically not associated with the authorized user of the mobile device 12 can be determined to be a security vulnerability. In a further illustrative example, a breach of the at least one enterprise rule set where the mobile device 12 is connected to a communication network 14 which lacks a required degree of security and can be deemed to be a security vulnerability.

Rule engine 42 may determine a security vulnerability based on information associated with the nearby communication networks 14. For example, in response to determining the received geolocation information is correlated to the particular network that lacks a required degree of security, the rule engine 42 can detect a security vulnerability event. The required degree of security can be configured such that the mobile device 12 can be precluded from accessing enterprise resources (e.g., the rule engine 42 detects a security vulnerability event) while using network access points that are unauthorized (e.g., access points associated with fraudulent activity, unauthorized tunnels, etc.). Security vulnerability events can be detected where the communications networks 14 in the vicinity of the mobile device 12 during the actions is associated with organized crime, or the communications networks 14 accessed by or likely to be accessed by the user of the mobile device 12 implements outdated security protocols, or the communications networks 14 in the vicinity of the mobile device 12 are unexpected (e.g., where an employee creates an unauthorized tunnel to the enterprise system 16), or the communications networks 14 in the vicinity of the mobile device 12 exhibit unusual characteristics (e.g., the wireless networks move to a greater extent than expected of static networks, or exhibit frequent on-and-off performance), and so forth. The rule engine 42 can also detect security vulnerability events by in part weighing the severity of the breach of the rules and the risk indicated by the geolocation information. For example, a low-risk installation of a camera app may not be detected as a security vulnerability event if installed at a home location.

In another illustrative example, the rule engine 42 can prevent the action or use associated with a request to access enterprise resource in response to determining the received geolocation information is associated with a flagged location, or the action or activity is associated with or near the flagged location. The flagged location may be a location known to be associated with fraudulent activity (e.g., tourist areas), where previous vulnerability events have occurred. The flagged location can be based in part on the user of the mobile device 12. For example, the flagged location can be a location not associated with an expected location of the user of mobile device 12 (e.g., a user based in New York is not expected to access the enterprise resources from Alaska in the same day).

The described blocks 402, 404, 406, 408, 410, 412, and 414 can be completed in part on at least a server of the security system 10, or at least a server of the enterprise system 16, or the mobile device 12, or any combination thereof. In example embodiments, a first set of instructions (e.g., a non-transitory computer readable medium comprising computer executable instructions to complete the aforementioned steps) on the mobile device 12 complete blocks 402, 404, 406, 408, 410, 412, including the receiving of the device data, accessing the enterprise rule set, and detecting breaches of the accessed enterprise rule set. The first set of instructions include instructions (shown as optional blocks 407 and 413, which respectively show transmitting breach information and geolocation information) to transmit information local to the mobile device 12 to implement block 414. The first set of instructions can also particularize a destination to which the information is being transmitted. Continuing the example, a second set of instructions (e.g., a non-transitory computer readable medium comprising computer executable instructions to complete the aforementioned operations) on a server of enterprise system 16 (e.g., server 902 of FIG. 9) completes the steps associated with determining if a security vulnerability is associated with the mobile device.

At block 416, the rule engine 42, after determining there is a security vulnerability based on the device data and the received geolocation information, can prevent or terminate access to the enterprise resources (i.e., prevent an action or use).

Figure 6:
FIGS. 5 to 7 show example alerts generated by a mobile device resource access management system.
Figure 5:

Optionally, at block 418, the mobile device 12 may be configured to broadcast or display a warning where the rule has been breached and the received geolocation data is indicative of a vulnerability event. The warning can prevent the action and notify the user of the adverse event (e.g., as shown in the notification 80 of FIG. 5), require further user input in order to be satisfied (e.g., the notification 82 as shown in FIG. 6, requiring the user to re-authenticate, or take additional authentication steps to continue with access to the enterprise resources). In embodiments where the rule engine 42 determines that the rule has been breached on the mobile device 12, the aforementioned determination may be broadcasted to security system 10, which can act as a firewall to prevent further access to enterprise resources.

Figure 7:
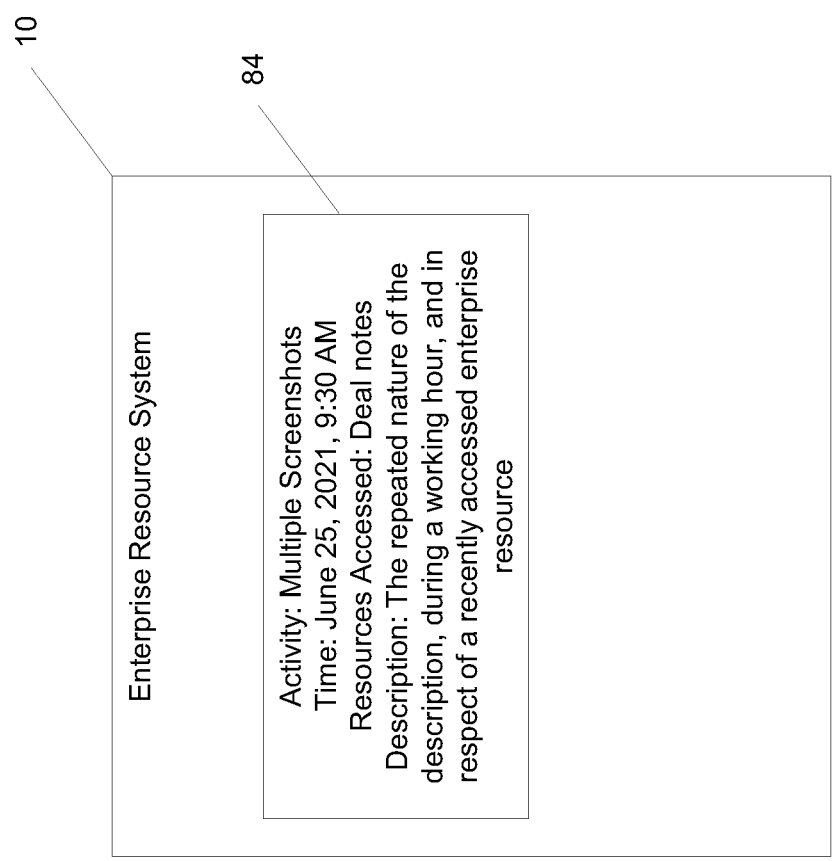

FIG. 7 illustrates an example warning 84 resulting from a broadcast from rule engine 42 being received by security system 10. The warning 84 may particularize the series of events that led to rule engine 42 rejecting the request for access to enterprise resources, allowing for rapid troubleshooting. In the shown embodiment, the warning 84 particularizes the actions, the time of the actions, the types of enterprise resources that were being access, and a further description which may be preprogrammed or auto generated.

In response to receiving the aforementioned warning, security system 10 can be configured to search for mobile devices exhibiting similar actions or patterns of activity. For example, excessive screenshot captures, or transmission of information to an unidentified remote server hosted an unexpected country, or so forth may be an indicator of malware or other malicious software and security system 10 may preclude access to the enterprise resources to any other mobile device 12 exhibiting similar behavior.

Security system 10 can also be configured to prevent access to enterprise resources to mobile device 12 within a certain geographical radius of a mobile device team to be breached. For example, enterprise register mobile devices 12 may not be able to access enterprise resources where particular wireless network identifiers detected, and a region currently associated with cybercrime, and so forth.

Figure 8:
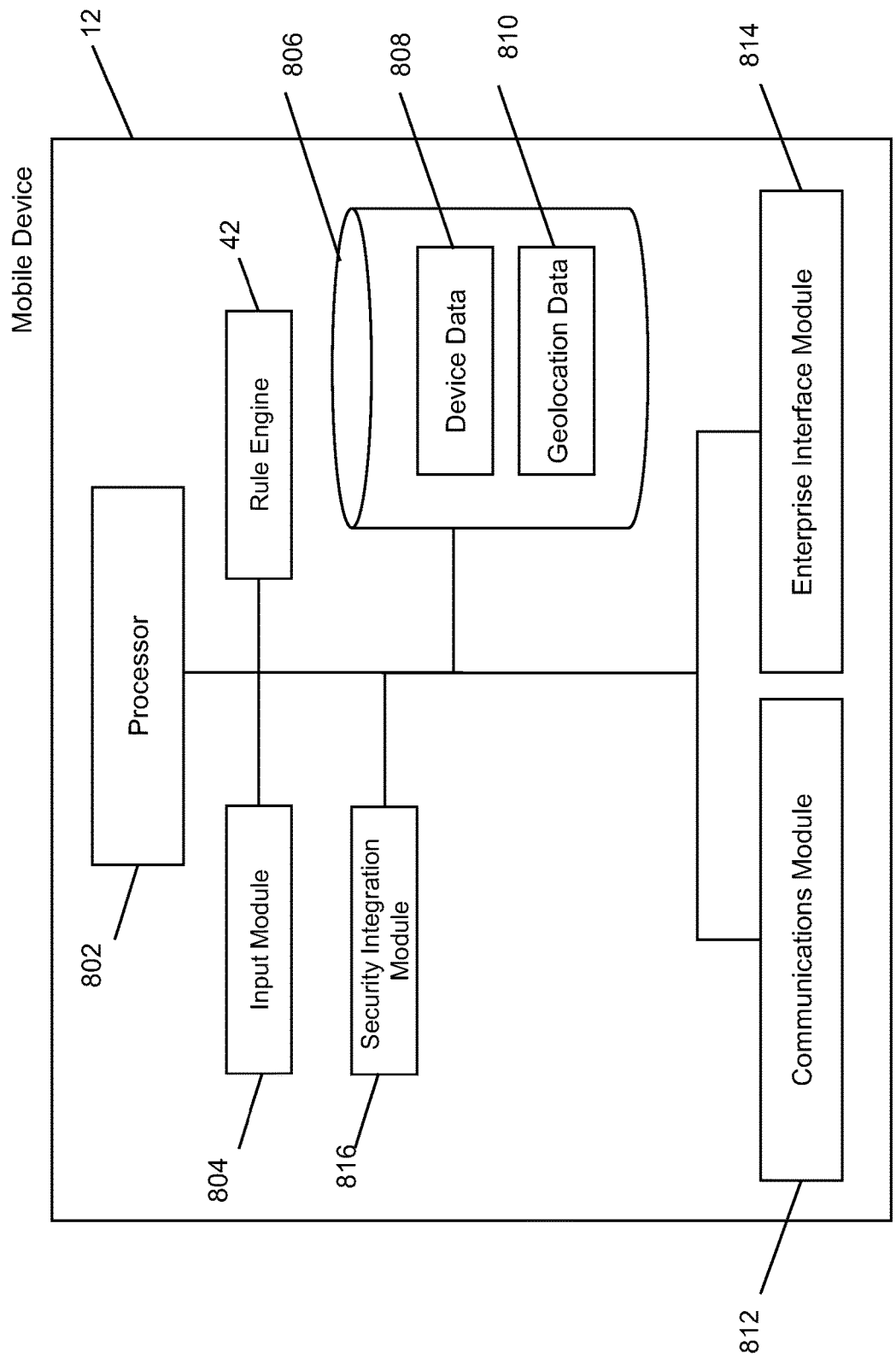
FIG. 8 shows an example configuration of a mobile device.

In FIG. 8, an example configuration of the mobile device 12 is shown. In certain embodiments, the mobile device 12 may include one or more processors 802, a communications module 812, and an enterprise interface module 814 for interfacing with the enterprise system 16 and storage 806 to retrieve, modify, and store (e.g., add) device data 808 or geolocation data 810. Communications module 812 enables the mobile device 12 to communicate with one or more other components of the computing environment 8 such as enterprise system 16 (or one of its components), via a bus or other communication network, such as the communication network 14. Storage 806 includes at least one memory or memory device that can include a tangible and non-transitory computer-readable medium having stored therein computer programs, sets of instructions, code, or data to be executed by processor 802. FIG. 8 illustrates examples of modules, tools and engines stored in memory by the mobile device 12 and operated by the processor 802. It can be appreciated that any of the modules, tools, and engines shown in FIG. 8 may also be hosted externally and be available to the mobile device 12, e.g., via the communications module 814, In the example embodiment shown in FIG. 8, the mobile device 12 includes the rule engine 42, a security integration module 816 for interacting with the security system 10, and an input module 804.

The mobile device 12 can be configured to apply a hierarchy of permission levels or otherwise apply predetermined criteria to determine whether data stored on storage 806, including documents, metadata, or application data can be shared with which entity in the computing environment 8. As such, device location determinations as described herein can be used by the mobile device 12 to control the sharing of data stored on storage 806 based on the at least one enterprise rule sets, or any other restriction imposed by the computing environment 8 or enterprise application 38/security application 36 with which the mobile device 12 is used.

The enterprise interface module 814 can provide a graphical user interface (GUI) or API connectivity to communicate with the enterprise module 814. It can be appreciated that the enterprise interface module 814 may also provide a web browser-based interface, an application or "app" interface (i.e., enterprise application 38), a machine language interface, etc.

Figure 9:
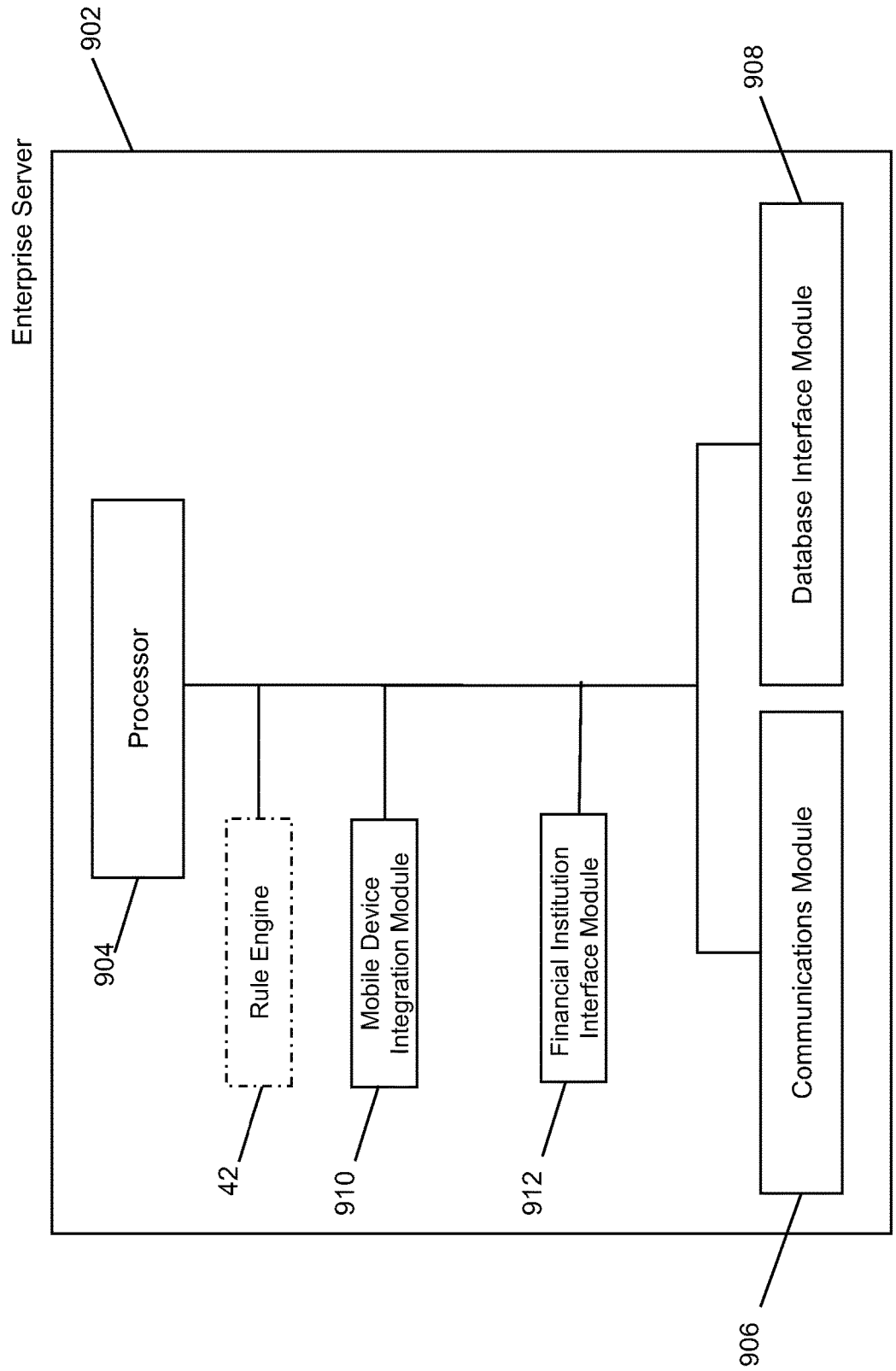
FIG. 9. shows an example configuration of a server of an enterprise system or a security system.

In FIG. 9, an example configuration of a server 902 of the enterprise system 16 is shown. In certain embodiments, the server 902 may include one or more processors 904, a communications module 906, and a database interface module 908 for interfacing with the database 18 (whether via a cloud computing solution or otherwise) to retrieve, modify, and store (e.g., add) data. Communications module 906 enables the server 902 to communicate with one or more other components of the computing environment 8 such as mobile device 12 (or one of its components), via a bus or other communication network, such as the communication network 14. While not delineated in FIG. 9, the server 902 includes at least one memory or memory device that can include a tangible, and non-transitory computer-readable medium having stored therein computer programs, sets of instructions, code, or data to be executed by processor 904. FIG. 9 illustrates examples of modules, tools and engines stored in memory by the server 902 and operated by the processor 904. It can be appreciated that any of the modules, tools, and engines shown in FIG. 9 may also be hosted externally and be available to the server 902, e.g., via the communications module 906, or on a different enterprise server, in whole or in part. In the example embodiment shown in FIG. 9, the server 902 includes a mobile device, integration module 156, an enterprise interface module (shown as a financial institution interface module 912), and the rule engine 42.

Similar to the mobile device 12, the server 902 can be configured to apply a set of enterprise rules or apply predetermined criteria via rule engine 42 to determine what data stored on database 18 (e.g., documents, metadata, or application data) can be shared with which mobile device 12 in the computing environment 8. As such, determining physical locations associated with activities detected on mobile devices can be used by the server 902 to control the sharing of certain enterprise resources based on enterprise rules (which may be based on a type of client/user/application, a permission or preference, or any other restriction) imposed by the computing environment 8 or enterprise application 38 with which the server 902 is used.

The mobile device integration module 910 or the financial institution interface module 912 can be used by server 902 to provide a graphical user interface (GUI) or API connectivity to communicate with the enterprise system 16. It can be appreciated that the enterprise interface module 912 may also provide a web browser-based interface, an application or "app" interface (e.g., enterprise application 38), a machine language interface, etc.

In example embodiments, the server 902 can be a server operated by the security system 10.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A system for determining physical locations associated with activities detected on mobile devices, the system comprising:
   a processor;
   a communications module coupled to the processor; and
   a memory coupled to the processor, the memory storing computer executable instructions that when executed by the processor cause the processor to:
   access at least one enterprise rule set, the at least one enterprise rule set based on a plurality of security vulnerability events, the at least one enterprise rule set for monitoring at least one application used on the mobile devices;
   receive device data indicative of one or more actions performed on a mobile device and a time associated with each action;
   compare the device data with the at least one enterprise rule set to detect whether any of the one or more actions performed on the mobile device breaches a rule of the at least one enterprise rule set;
   transmit, to a geolocation service, a request for geolocation information associated with the mobile device at the time associated with the breach of the corresponding rule, the request including at least one of an identifier associated with the mobile device, an identifier associated with one or more wireless network access points which the mobile device is in range of, or both;
   receive, from the geolocation service, geolocation information associated with the transmitted identifier, wherein the geolocation service is an external database for collecting information about wireless network access points; and
   use the received geolocation information, the device data, and the at least one enterprise rule set to determine if a security vulnerability is associated with the mobile device, wherein the security vulnerability is detected in response to the one or more wireless network access points exhibiting on-and-off performance more than a threshold based on a frequency.

2. The system of claim 1, wherein the system comprises a first set of instructions executed on the mobile device and a second set of instructions executed on a server device.

3. The system of claim 1, wherein the one or more actions performed on the mobile device comprises at least one screenshot.

4. The system of claim 1, wherein the one or more actions performed on the mobile device comprises executing a file sharing activity.

5. The system of claim 1, wherein the one or more actions performed on the mobile device comprises accessing a particular network.

6. The system of claim 5, wherein the computer executable instructions further cause the processor to:
   in response to determining the received geolocation information is correlated to the particular network that lacks a required degree of security, preventing at least one action on the mobile device.

7. The system of claim 1, wherein the computer executable instructions further cause the processor to:
   in response to determining the received geolocation information is associated with a flagged location, or activity associated with or near the flagged location, prevent at least one action on the mobile device.

8. The system of claim 1, wherein, to determine if a security vulnerability is associated with the mobile device, the instructions cause the processor to:
   determine a likelihood that location data of the mobile device associated with each action is accurate based on the received geolocation information;
   in response to determining the likelihood is below a threshold, detect a security vulnerability.

9. The system of claim 1, wherein the transmitted request comprises location data of the mobile device at the time associated with each action, and the received geolocation information comprises cached information about wireless networks within range of the location data, and to determine if a security vulnerability is associated with the mobile device, the instructions cause the processor to:
   compare the one or more wireless network access points which the mobile device is in range of to the cached information about wireless networks received from the geolocation service.

10. The system of claim 9, wherein the security vulnerability is detected in response to the comparison showing unexpected networks in the one or more wireless network access points which the mobile device is in range of.

11. The system of claim 9, wherein the security vulnerability is detected in response to the comparison showing the one or more wireless network access points which the mobile device is in range of moving more than a threshold amount.

12. The system of claim 1, wherein the security vulnerability is detected based on a comparison of a severity of the breach of the at least one enterprise rules and a risk indicated by the geolocation information.

13. A method for determining physical locations associated with activities detected on mobile devices, the method comprising:
   accessing at least one enterprise rule set, the at least one enterprise rule set based on a plurality of security vulnerability events, the at least one enterprise rule set for monitoring at least one application used on the mobile devices;
   receiving device data indicative of one or more actions performed on a mobile device and a time associated with each action;
   comparing the device data with the at least one enterprise rule set to detect whether any of the one or more actions performed on the mobile device breaches a rule of the at least one enterprise rule set;
   transmitting, to a geolocation service, a request for geolocation information associated with the mobile device at the time associated with the breach of the corresponding rule, the request including at least one of an identifier associated with the mobile device, an identifier associated with one or more wireless network access points which the mobile device is in range of, or both;
   receiving, from the geolocation service, geolocation information associated with the transmitted identifier, wherein the geolocation service is an external database for collecting information about wireless network access points; and
   using the received geolocation information, the device data, and the at least one enterprise rule set to determine if a security vulnerability is associated with the mobile device, wherein the security vulnerability is detected in response to the one or more wireless network access points exhibiting on-and-off performance more than a threshold based on a frequency.

14. The method of claim 13, wherein a first set of instructions is executed on the mobile device and a second set of instructions is executed on a server device.

15. The method of claim 13, wherein the one or more actions performed on the mobile device comprises at least one screenshot.

16. The method of claim 13, wherein the one or more actions performed on the mobile device comprises executing a file sharing activity.

17. The method of claim 13, wherein the one or more actions performed on the mobile device comprises accessing a particular network.

18. The method of claim 17, comprising:
in response to determining the received geolocation information is correlated to the particular network that lacks a required degree of security, preventing at least one action on the mobile device.

19. The method of claim 13, further comprising:
in response to determining the received geolocation information is associated with a flagged location, or activity associated with or near the flagged location, preventing at least one action on the mobile device.

20. A non-transitory computer readable medium for determining physical locations associated with activities detected on mobile devices, the computer readable medium comprising computer executable instructions for:
accessing at least one enterprise rule set, the at least one enterprise rule set based on a plurality of security vulnerability events, the at least one enterprise rule set for monitoring at least one application used on the mobile devices;

receiving device data indicative of one or more actions performed on a mobile device and a time associated with each action;

comparing the device data with the at least one enterprise rule set to detect whether any of the one or more actions performed on the mobile device breaches a rule of the at least one enterprise rule set;

transmitting, to a geolocation service, a request for geolocation information associated with the mobile device at the time associated with the breach of the corresponding rule, the request including at least one of an identifier associated with the mobile device, an identifier associated with one or more wireless network access points which the mobile device is in range of, or both;

receiving, from the geolocation service, geolocation information associated with the transmitted identifier, wherein the geolocation service is an external database for collecting information about wireless network access points; and using the received geolocation information, the device data, and the at least one enterprise rule set to determine if a security vulnerability is associated with the mobile device, wherein the security vulnerability is detected in response to the one or more wireless network access points exhibiting on-and-off performance more than a threshold based on a frequency.

* * * * *